(12) United States Patent
Kao et al.

(10) Patent No.: US 8,109,655 B2
(45) Date of Patent: Feb. 7, 2012

(54) ILLUMINATION DEVICE AND OPERATING METHOD THEREOF AND ELECTRONIC APPARATUS HAVING THE SAME

(75) Inventors: Kuo-Lun Kao, Taipei (TW); Yi Ming Chang, Taipei (TW); Chung-Teng Wu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 308 days.

(21) Appl. No.: 12/472,708

(22) Filed: May 27, 2009

(65) Prior Publication Data
US 2010/0214773 A1 Aug. 26, 2010

(30) Foreign Application Priority Data
Feb. 25, 2009 (TW) .............................. 98106016 A (51) Int. Cl.
*F21V 21/26* (2006.01)
(52) U.S. Cl. ......... 362/269; 362/287; 362/288; 362/155
(58) Field of Classification Search .......... 362/285–288, 362/427–428, 155, 269
See application file for complete search history.

(56) References Cited

U.S. PATENT DOCUMENTS
8,021,022 B2 * 9/2011 Ling et al. ...................... 362/274

2007/0103918 A1 * 5/2007 Lin ................................ 362/427
2008/0266865 A1 10/2008 Lev et al.
2009/0323319 A1 * 12/2009 Lin ................................ 362/144

FOREIGN PATENT DOCUMENTS
CN 200965652 10/2007

OTHER PUBLICATIONS
English translation of abstract of CN 200965652.

* cited by examiner

*Primary Examiner* — Robert May
(74) *Attorney, Agent, or Firm* — Thomas, Kayden, Horstemeyer & Risley, LLP (57) ABSTRACT

An electronic apparatus includes an input device and an illumination device. The illumination device includes a chassis, an illumination module and a positioning mechanism. The module is pivotally connected to the chassis to be rotatable between a closed and an open position. The positioning mechanism is use for respectively positioning the illumination module in the closed and the open position. An operating method of the illumination device includes the following steps. First, a push force is applied to the module in the closed position. Then the module rotates from the closed position to the open position. The module enters a light-on state as arrived in the open position for illuminating the input device. Next, another push force is applied to the module in the open position, so that the module rotates to the closed position. The module enters a light-off state as arrived in the closed position.

19 Claims, 7 Drawing Sheets

ILLUMINATION DEVICE AND OPERATING METHOD THEREOF AND ELECTRONIC APPARATUS HAVING THE SAME

RELATED APPLICATIONS

This application claims priority to Taiwan Application Serial Number 98106016, filed Feb. 25, 2009, which is herein incorporated by reference.

BACKGROUND

1. Field of Invention

The present invention relates to an illumination device and an operating method thereof and an electronic apparatus having the same. More particularly, the present invention relates to a retractable illumination device and an operating method thereof and an electronic apparatus having the same.

2. Description of Related Art

Electronic products on the market nowadays keep evolving and advancing, their functions are more user-friendly and more suitable for using in our daily activities. Therefore, the application of the electronic products has been spread out widely, from earlier limited office use to now use in our living rooms or bedrooms, even to restaurants and coffee shops. Generally, an electronic product needs an input device, such as a keyboard or a touch pad, to input data and to operate the product. In practical use, one is able to easily recognize the symbols on the keyboard or the locations of the function keys within a bright environment, such as in a well-lighted office. On the contrary, however, it is difficult for a user to identify the location of each button or each function key in a dim place or at night, causing the inconvenience of operating the electronic product.

To solve this problem, various illumination devices that are externally connected to the electronic products for illuminating the input devices the electronic products are brought out on the market. Take an external lamp that is powered through a USB slot of a notebook computer as an example. When the external lamp is connected to the electronic product, the overall appearance of the product is affected. Another drawback is that the user has to bear the inconvenience of additionally carrying the external lamp. Further, before using the external lamp, the user has to plug the external lamp into the USB slot, also increasing the inconvenience. On the other hand, a kind of illumination device that is integrated in the electronic product is brought out. However, this kind of integrated illumination device has the shortcoming of requiring software operation or a designated activation button to activate the illumination device, and the inconvenience still remains.

SUMMARY

An illumination device and an operating method and an electronic apparatus are provided in the present invention. By applying a push force to an illumination module of the illumination device, the illumination module can be respectively positioned in an open position and a closed position, so as to activate and deactivate the illuminating functionality respectively.

According to one aspect of the invention, an illumination device is provided. The illumination device includes a chassis, an illumination module and a positioning mechanism. The illumination module is pivotally connected to the chassis to be rotatable between a closed position and an open position. When a push force is applied to the illumination module in the closed position, the illumination module rotates from the closed position to the open position. The positioning mechanism is used for respectively positioning the illumination module in the open position and the closed position. The illumination module is in a light-on state when situated in the open position, and in a light-off state when situated in the closed position.

According to another aspect of the invention, an operating method of an illumination device is provided. The illumination device at least includes a chassis and an illumination module. The method includes the following steps. First, a push force is applied to the illumination module situated in a closed position. Then the illumination module rotates from the closed position to an open position relative to the chassis. When the illumination module is situated in the open position, the illumination module enters a light-on state. Further, another push force is applied to the illumination module situated in the open position so that the illumination module rotates from the open position to the closed position relative to the chassis. When the illumination module is situated in the closed position, the illumination module enters a light-off state.

According to a further aspect of the invention, an electronic apparatus including an input device and an illumination device is provided. The illumination device includes a chassis, an illumination module and a positioning mechanism. The illumination module is pivotally connected to the chassis to be rotatable between a closed position and an open position. When a push force is applied to the illumination module situated in the closed position, the illumination module is shifted along the push force and then rotates from the closed position to the open position. The positioning mechanism is used for respectively positioning the illumination module in the open position and the closed position. The illumination module is in a light-on state when the illumination module is situated in the open position for illuminating the input device. The illumination module is in a light-off state when the illumination module is situated in the closed position.

In the present invention, the illumination module is popped up from the closed position to the open position, or is retracted back to the closed position, simply by pushing the illumination module of the illumination device. So the illuminating functionality can be activated or deactivated accordingly. The present invention at least has the merits of simple operation and aesthetic appearance.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings.

In one embodiment of the invention, an illumination module rotates from a closed position to an open position, or vice versa, after pushed or pressed by a push force. The illumination module is in a light-on state and a light-off state while situated in the open position and the closed position respectively. The present embodiment at least has the merit of convenient operation, since the activation or deactivation of the illuminating functionality is achieved by a simple pressing or pushing action.

An illumination device according to one embodiment of the invention is elaborated below with referring to FIG. 1, which is an exploded diagram of an illumination device according to one embodiment of the invention. The illumination device 100 includes a chassis 150, an illumination module 110 and a positioning mechanism 130. The illumination module 110 is pivotally connected to the chassis 150 to be rotatable between a closed position and an open position. When a push force, or an external force, is applied to the illumination module 100 situated in the closed position, the illumination module 110 rotates from the closed position to the open position. The positioning mechanism 130 is used for respectively positioning the illumination module 110 in the open position and the closed position. The illumination module 110 is in a light-on state when situated in the open position, and in a light-off state when situated in the closed position. The open position and the closed position will be further elaborated afterwards.

Figure 2A:
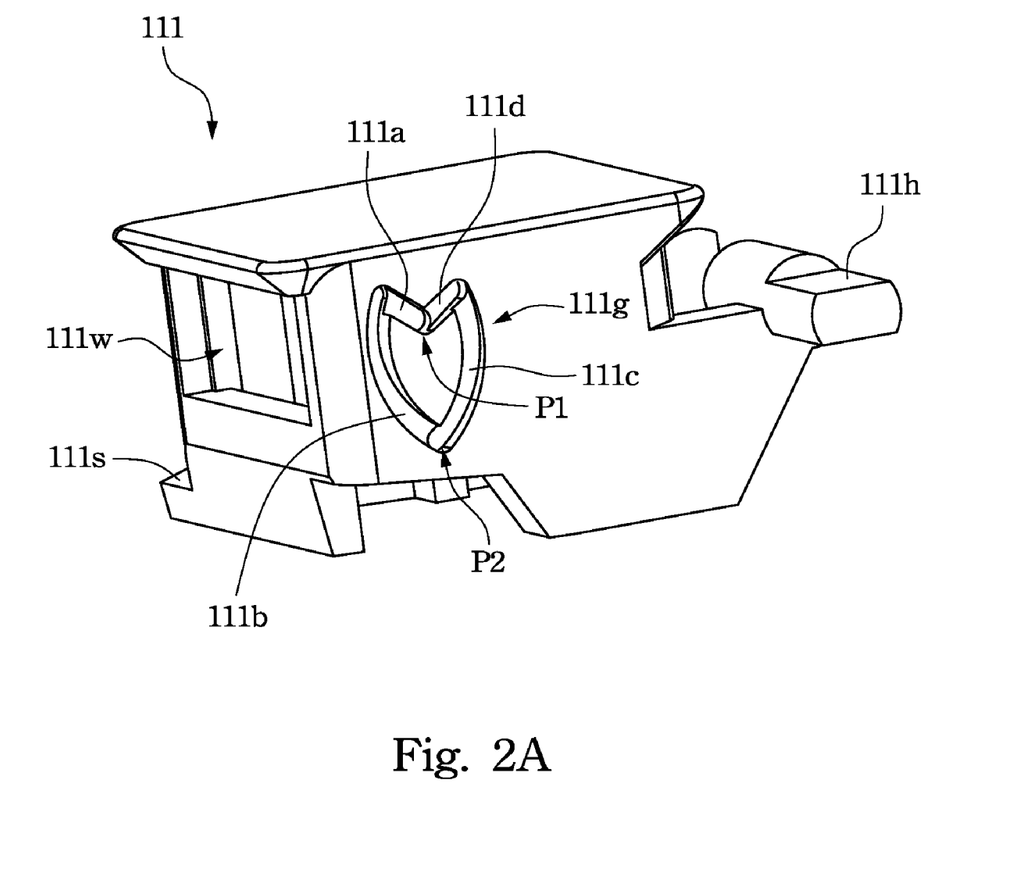
FIG. 2A is a three-dimensional view of a housing according to one embodiment of the invention.
Figure 2B:
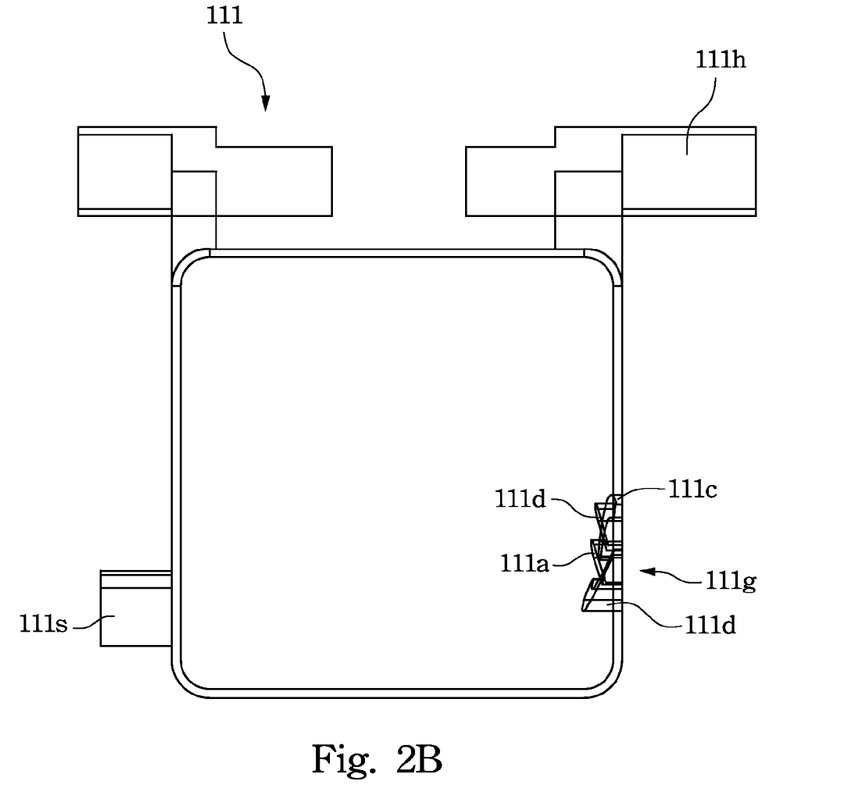
FIG. 2B is a vertical view of the housing.

The illumination module 110 of the illumination device 100 is now further detailed in the present embodiment. The illumination module 110 mainly includes a housing 111 and a light source 112. The light source 112 is disposed in the housing 111 and is used for providing light when the illumination module 110 is in the light-on state. Please refer to FIG. 2A and FIG. 2B at the same time. FIG. 2A is a three-dimensional view of a housing according to one embodiment of the invention. FIG. 2B is a vertical view of the housing. The housing 111 has a limiting track 111g having a number of stair-like steps 111a~111d. The limiting track 111g can be formed integrally with the housing 111, or, alternatively, formed by disposing one pre-constructed limiting track element into a fillister that is formed on the housing 111. In the present embodiment, the positioning mechanism 130 mainly includes a positioning pin 131 having an end being in contact with the steps 111a~111d and being movable within the limiting track 111g. The positioning pin 131 has an opposite end disposed in the chassis 150. The limiting track 111g of the present embodiment is an annular ring, and said end of the limiting track 111g is movable within the limiting track 111g along a reversible single direction. More specifically, the limiting track 111g of the present embodiment is generally heart-shaped and has a dented location P1 and a vertex location P2. The illumination module 110 stays in the closed position when the positioning pin 131 is positioned in the dented location P1. The illumination module 110 stays in the open position when the positioning pin 131 is positioned in the vertex location P2.

Figure 1:
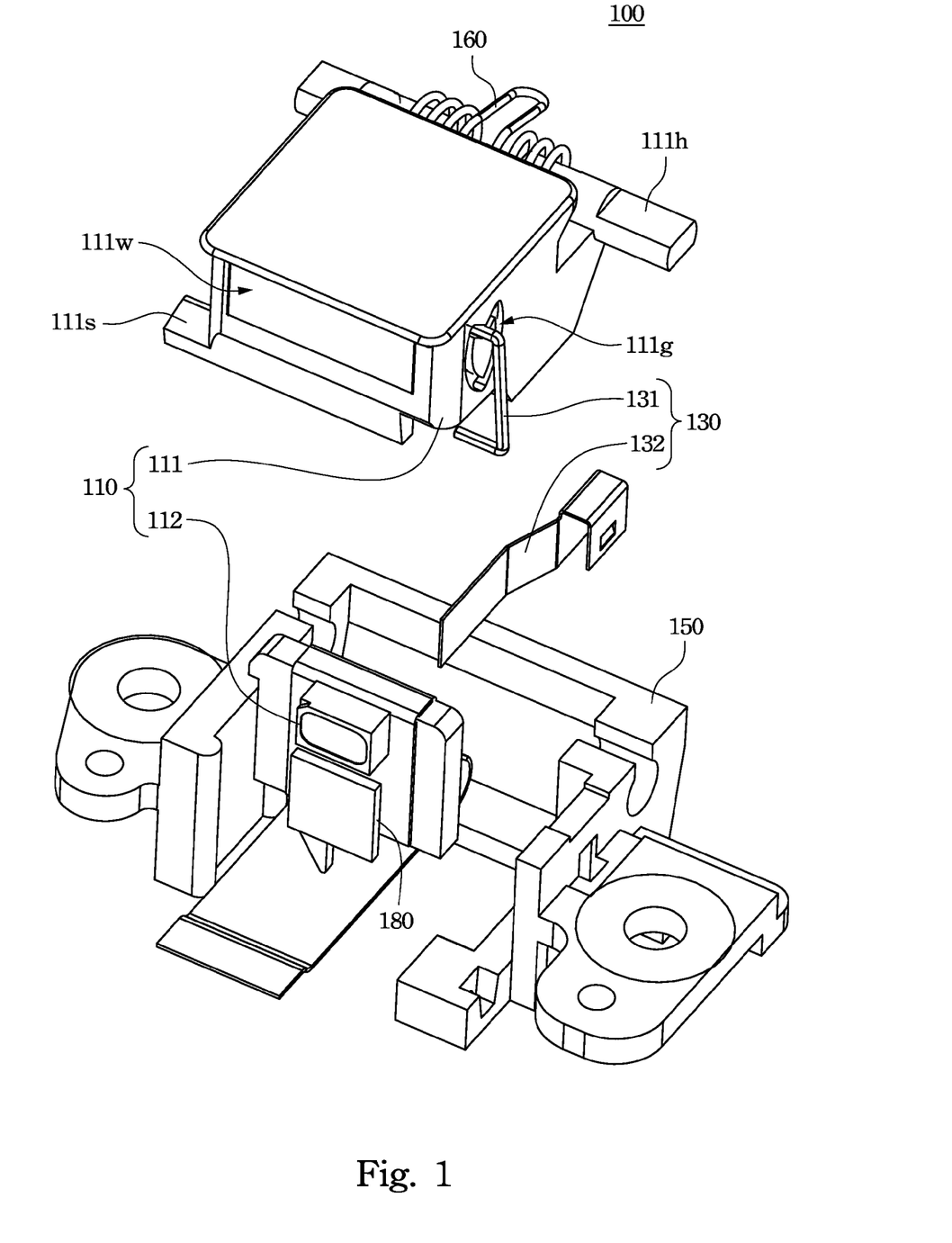
FIG. 1 is an exploded diagram of an illumination device according to one embodiment of the invention.
Figure 2C:
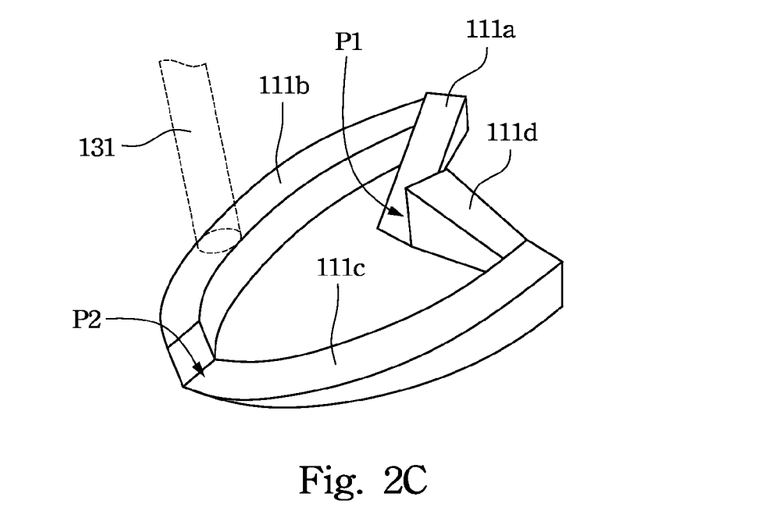
FIG. 2C illustrates a number of steps of the limiting track.

Furthermore, the limiting track 111g of the housing 111 is elaborated with referring to FIG. 2C. A number of steps 111a~111d of the limiting track 111g are illustrated in FIG. 2C. Any one of the steps 111a~111d is a one-way slanted structure whose surface is descended from a slope top to a slope bottom. The slope top of each step 111a, 111b, 111c and 111d is connected to the slope bottom of its adjacent step 111b, 1111c, 111d and 111a. Therefore these steps 111a~111d are linked together to form a stair-like structure. The positioning mechanism 130 further includes a retaining plate 132 as shown in FIG. 1. The retaining plate 132 is used to lean against the positioning pin 131, so that said end of the positioning pin 131 can be constantly in contact with the steps 111a~111d while moving within the limiting track 111g. As moving within the limiting track 111g, said end of the positioning pin 131 is moved from the slope bottom to the slope top of one step 111a, 111b, 111c or 111d, and then falls onto the slope bottom of its adjacent step 111b, 111c, 111d or 111a. Then, again, said end is moved from the slope bottom to the slope top along the slanted surface of one step 111b, 111c, 111d or 111a. As a result, said end of the positioning pin 131 is repeatedly and annularly moving within the limiting track 111g along the irreversible single direction.

Figure 3A:
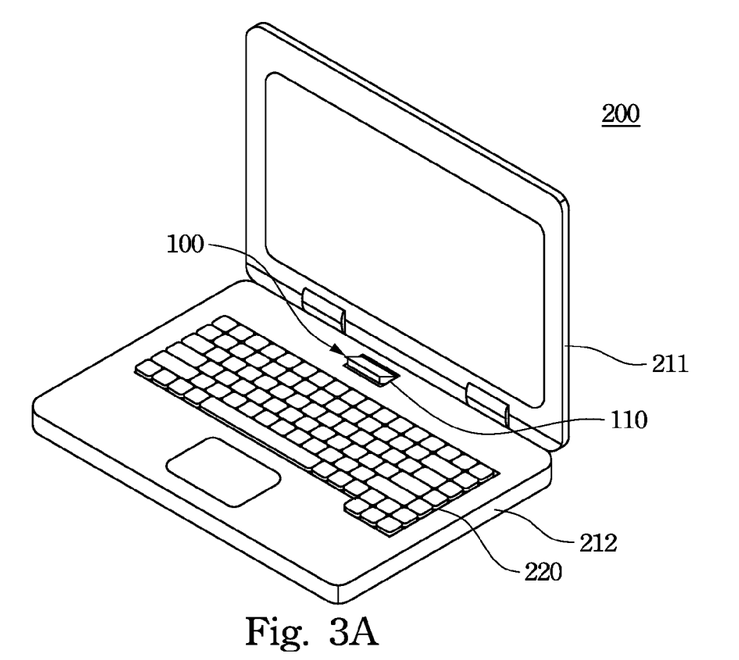
FIG. 3A illustrates an electronic apparatus according to one embodiment of the invention.
Figure 3B:
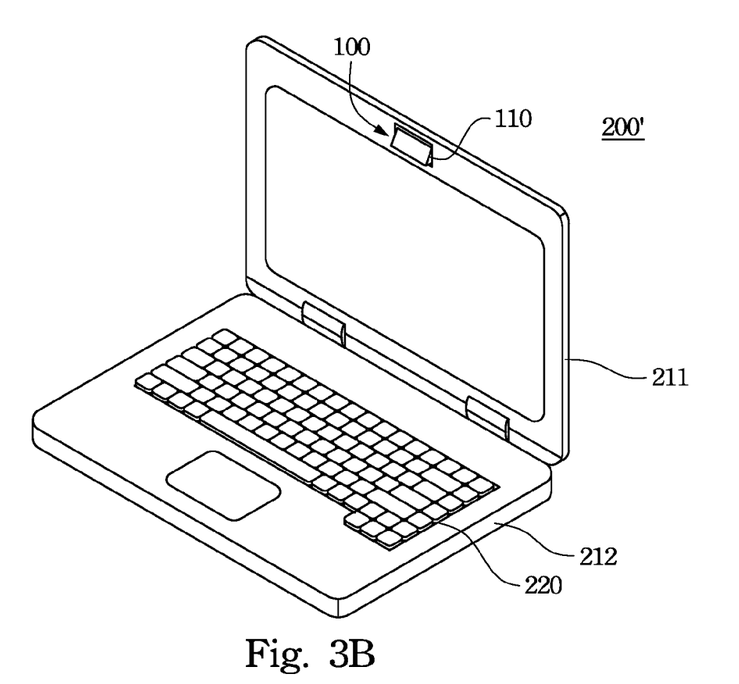
FIG. 3B illustrates an electronic apparatus according to another embodiment of the invention.

On the other hand, the illumination device 100 of the present embodiment is suitable for using in an electronic apparatus. Please refer to FIG. 3A, an electronic apparatus according to one embodiment of the invention is shown. The electronic apparatus 200 includes an input device 220 and the illumination device 100. Exemplarily, the illumination device 100 is used for illuminating the input device 220 while in the light-on state. As shown in FIG. 3A, the electronic apparatus 200 further include an upper casing 211 and a lower casing 212. The upper casing 211 is pivotally connected to the lower casing 212. In the present embodiment, both the illumination device 100 and the input device 220 are disposed in the lower casing 212, and the illumination module 110 is pivotally connected to the lower casing 212. More specifically, in one exemplary case, the chassis 150 and the lower casing 212 are formed in one piece. However, the disposition of the illumination device 100 is not limited to the above-described manner. For example, the illumination device 100 and the input device 220 can be separately disposed in the upper casing 211 and the lower casing 212. Please refer to FIG. 3B, an electronic apparatus according to another embodiment of the invention is shown. In the electronic apparatus 200', the illumination device 100 is disposed in the upper casing 211 and the input device 220 is disposed in the lower casing 212, and the illumination module 110 is pivotally connected to the upper casing 211. In another exemplary case, the chassis 150 and the upper casing 211 are formed in one piece. In addition, the illumination device 100 can also be disposed in other locations on the electronic apparatus 200 according to R&D requirements. Generally, any other dispositions of the illumination device 100 that can be used to illuminate the input device 220 or other components of the electronic apparatus 200 are eligible in the present embodiment. Practically, the electronic apparatus 200 can be a notebook computer, and the input device 220 is a keyboard of the notebook computer. The technology of the present invention is not limited thereto. The electronic apparatus 200 can also be other apparatus in need of illuminating its components, such as a keyboard device for a desktop computer.

Figure 4:
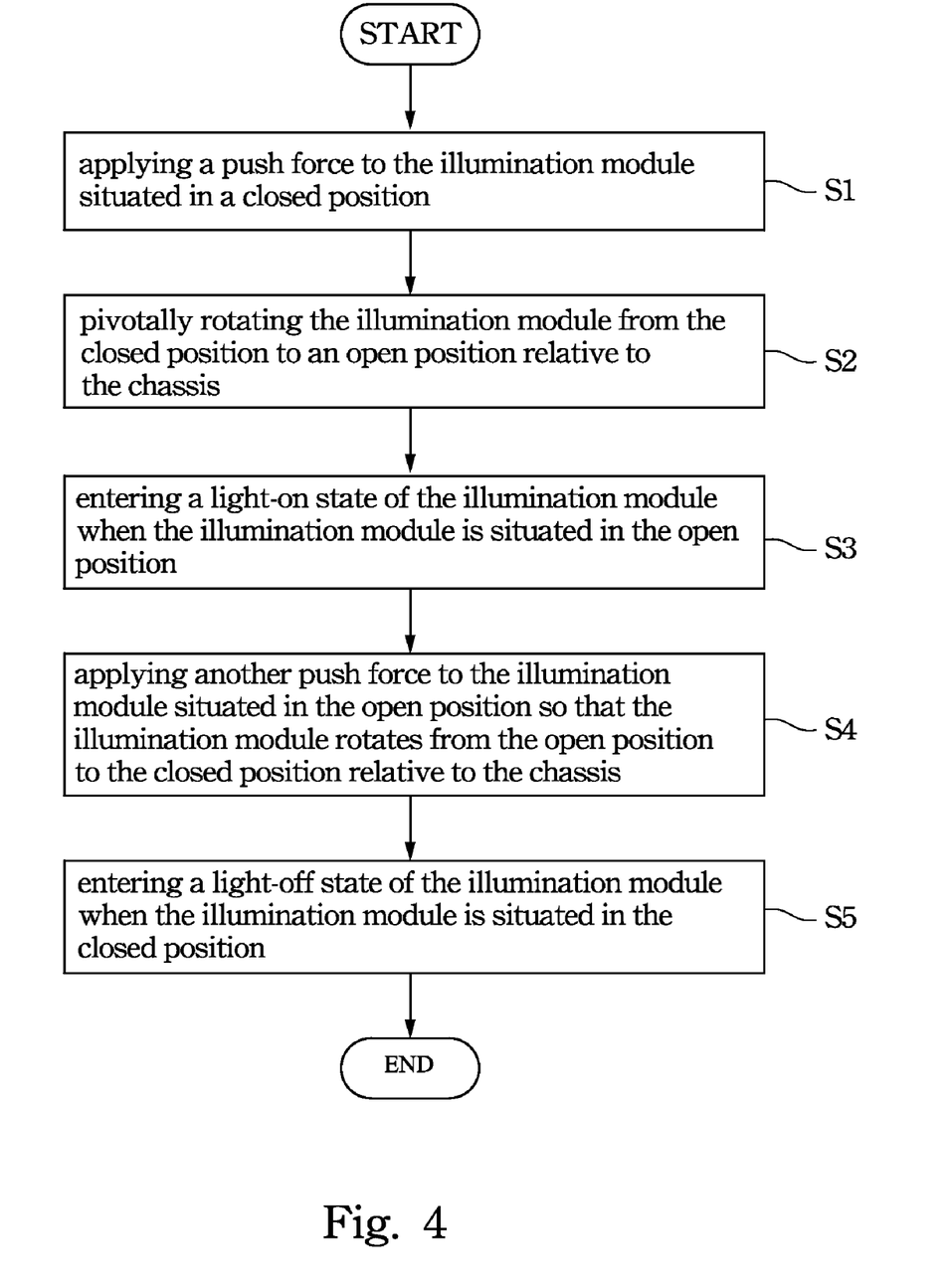
FIG. 4 is a flow-chart of an operating method of the illumination device according to one embodiment of the invention.
Figure 5A:
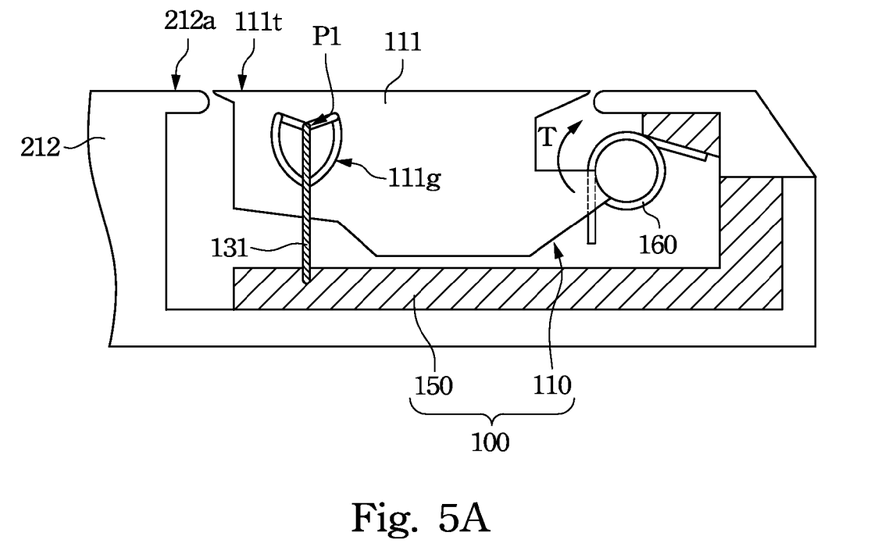
FIG. 5A is a cross-sectional view of the illumination module in the closed position.

Please refer to FIG. 4, a flow chart of an operating method of the illumination device 100 according to one embodiment of the invention is shown. The method includes the following steps. First, as shown in step S1, an external force is applied to the illumination module 110 situated in the closed position. The external force is exemplified by a push force here in the present embodiment. The illumination module 110 in the closed position is more detailed with referring to FIG. 5A. A cross-sectional view of the illumination module 110 in the closed position is shown in FIG. 5A. The illumination device 100 is exemplified by disposing in the lower casing 212 of the electronic apparatus 200. When the illumination module 110 is situated in the closed position, a top surface 111t of the housing 111 and a top surface 212a of the lower casing 212 are preferably situated in the same plane, so as to maintain a neat appearance and improve aesthetic. When the illumination module 110 is situated in the closed position, it stays in the lower casing 212 and in the light-off state. The illumination device 100 further includes an elastic element 160 disposing between the chassis 150 and the illumination module 110. The elastic element 160 is used for providing torsion T to the illumination module 110 to drive the pivotal rotation of the illumination module 110 from the closed position to the open position. When said end of the positioning pin 131 that is movable within the limiting track 111g situated in the dented location P1, the illumination module 110 stays in the closed position.

Figure 5B:
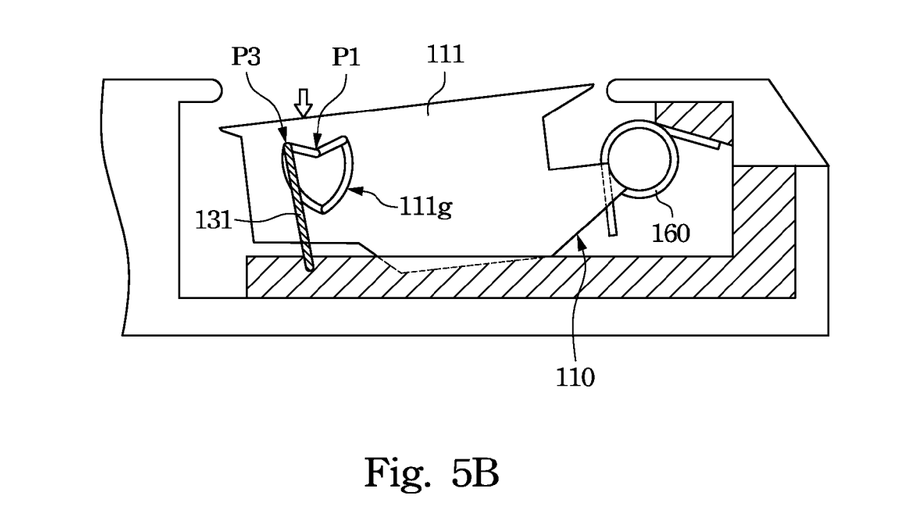
FIG. 5B is a cross-sectional view of the illumination module in the closed position being pressed by the push force.

Please refer to FIG. 5B, a cross-sectional view of the illumination module being pressed by the push force is illustrated. Practically, the illumination module 110 is moved from the location shown in FIG. 5A to that shown in FIG. 5B by the pushing of a user. When the push force is applied to the illumination module 110 in the closed position, said end of the positioning pin 131 is moved away from the dented location P1 of the limiting track 111g to a first stop location P3. In other words, the illumination module 110 is slightly shifted along the push force.

Figure 5C:
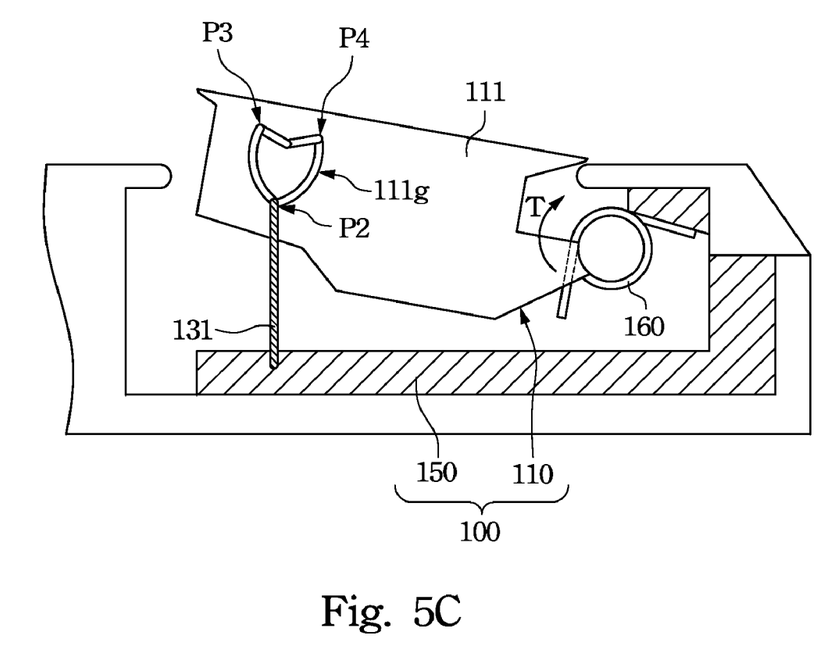
FIG. 5C is a cross-sectional view of the illumination module in the open position.

Next, as shown in step S2, the illumination module 110 is pivotally rotated from the closed position to the open position relative to the chassis 150. Please refer to FIG. 5C, a cross-sectional view of the illumination module in the open position is illustrated. In practical use, when user stops pushing the housing 111, the illumination module 110 rotates to the open position by the driving of the torsion T provided by the elastic element 160, and said end of the positioning pin 131 is moved to the vertex location P2. When said end of the positioning pin 131 is moved to the vertex location P2, the illumination module 110 is situated in the open position. The illumination module 110 enters the light-on state as shown in step S3, so as to illuminating the input device 220 (shown in FIG. 3A).

Figure 5D:
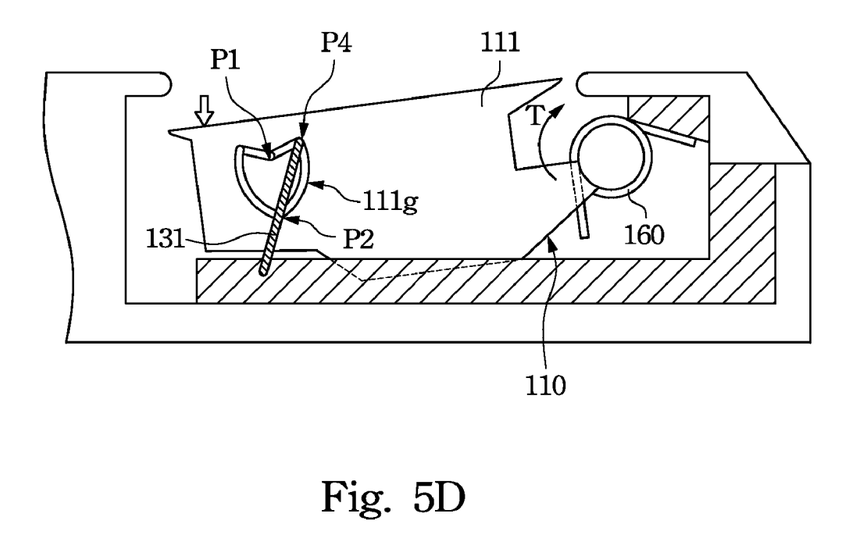
FIG. 5D is a cross-sectional view of the illumination module in the open position being pressed by another push force.

Further, step S4 is performed. Another push force is applied to the illumination module 110 in the open position so that the illumination module 110 rotates from the open position to the closed position relative to the chassis 150. Please refer to FIG. 5D, a cross-sectional view of the illumination module in the open position being pressed by another push force is illustrated. When another push force is applied to the illumination module 110 in the open position, said end of the positioning pin 131 is moved away from the vertex location P2 of the limiting track to a second stop location P4. Afterwards, when user stops pushing the housing 111, the illumination module 110 rotates to the closed position by the driving of the torsion T provided by the elastic element 160. The illumination module 110 returns to the state shown in FIG. 5A as said end of the positioning pin 131 arrives in the dented location P1. As shown in step S5, the illumination module 110 enters the light-off state while situated in the closed position.

In the above-described operating method of the illumination device 100 according to one embodiment of the invention, said end of the positioning pin 131, that is movable in the limiting track 111g, is sequentially moved from the dented location P1 to the first stop location P3, from the first stop location P3 to the vertex location P2, from the vertex location P2 to the second stop location P4, and finally back to the dented location P1. Thereby the repeated-positioning of the illumination module 110 respectively in the closed position and the open position is realized. The user only needs to push the housing 111 to activate or deactivate the illumination device 100, making it easy to operate.

As shown in FIG. 1, the housing 111 of the present embodiment further has a hinge 111h and a transparent window 111w. The housing 111 is pivotally connected to the chassis 150 through the hinge 111h so the illumination module 110 is rotatable relative to the chassis 150. The light source 112 of the illumination module 110 is exemplified by a light emitting diode (LED). When the illumination module 110 is in the light-on state, the light source 112 provides light passing through the transparent window 111w to illuminate the input device 220. Practically, the transparent windows 111w is an opening on the housing 111 or a window made of light-permissible material. On the other hand, the positioning mechanism 130 further includes a stopper 111s. Exemplarily, the stopper 111s is integrally formed with the housing 111 in the present embodiment. When the illumination module 110 is situated in the open position, the stopper 111s contacts against the chassis 150, or against the lower casing 212 of the electronic apparatus 200, for preventing the illumination module 110 from being over-rotated, so as to realize the positioning of the illumination module 110 in cooperation with the positioning pin 131. Furthermore, the illumination module 110 includes a switch 180 electrically connected with the light source 112. When the illumination module 110 is situated in the open position, the switch 180 forms a close circuit to activate the light source 112, making the illumination module 110 enter the light-on state. When the illumination module 110 is, on the other hand, situated in the closed position, the switch 180 forms an open circuit to deactivate the light source 112, making the illumination module 110 enter the light-off state.

In one example of the present embodiment, the positioning pin 131 has an end moving within the limiting track 111g while an opposite end of the positioning pin 131 is disposed in the chassis 150. However, in another example, the opposite end of the positioning pin 131 is disposed in the casing of an apparatus. Taking the electronic apparatus 200 in FIG. 3A as example, the illumination device 100 is disposed in the lower casing 212, and the opposite end of the positioning pin 131 can also be directly disposed in the lower casing 212.

The limiting track 111g is exemplified by having four steps 111a~111d and a heart-shaped structure. The illumination module 110 is positioned in the open position and in the closed position exemplarily by using said end of the positioning pin 131 that respectively positions in the vertex location P2 and in the dented location P1. However, the number of the steps and the shape of the limiting track 111g are not limited thereto. Any mechanism that realizes multi-location positioning with pushes, especially the mechanism having numerous steps to achieve the single-directional movement of said end of the positioning pin 131, is covered within the range of the present invention.

The above-described illumination device and operating method thereof and electronic apparatus having the same in the embodiment of the invention incorporate a push-push mechanism constructed by the positioning pin and the annular limiting track. In order to activate or deactivate the illumination module, the user only needs to push the illumination module, therefore greatly enhancing the convenience of operating. Besides that, no additional switches or buttons that used for popping up and activating the illumination module are needed, and the structure of the illumination device can therefore be simplified. The surface of the housing and the surface of the casing of the electronic apparatus are situated in the same plane when the illumination module is situated in the closed position, so the aesthetic appearance is maintained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An illumination device comprising:
   a chassis;
   an illumination module, which comprises a housing and a light source disposed in the housing, being pivotally connected to the chassis to be rotatable between a closed position and an open position, wherein when a push force is applied to the illumination module situated in the closed position, the illumination module rotates from the closed position to the open position, wherein the housing includes a limiting track having a plurality of stair-like steps; and
   a positioning mechanism for respectively positioning the illumination module in the open position and the closed position, and the positioning mechanism comprising a positioning pin having an end in contact with the stair-like steps and being movable within the limiting track;
   wherein the illumination module is in a light-on state when the illumination module is situated in the open position, and the illumination module is in a light-off state when the illumination module is situated in the closed position.

2. The illumination device of claim 1, wherein the illumination module further comprises:
   a stopper for preventing the illumination module from being over-rotated.

3. The illumination device of claim 1, wherein the illumination module further comprises:
   an elastic element disposed between the chassis and the illumination module for providing torsion to the illumination module to drive the pivotal rotation of the illumination module from the closed position to the open position.

4. The illumination device of claim 1, wherein the positioning pin has an opposite end disposed in the chassis.

5. The illumination device of claim 1, wherein said end of the positioning pin is movable within the limiting track along an irreversible single direction.

6. The illumination device of claim 5, wherein the limiting track is generally heart-shaped and has a dented location and a vertex location, the illumination module stays in the closed position when the positioning pin is positioned in the dented location of the limiting track, and the illumination module stays in the open position when the positioning pin is positioned in the vertex location.

7. The illumination device of claim 6, wherein when the push force is applied to the illumination module situated in the closed position, said end of the positioning pin is moved away from the dented location of the limiting track along the single direction.

8. The illumination device of claim 6, wherein when the push force is applied to the illumination module situated in the open position, said end of the positioning pin is moved away from the vertex location of the limiting track along the single direction.

9. The illumination device of claim 1, wherein the positioning mechanism further comprises a retaining plate for leaning against the positioning pin so that said end of the positioning pin is constantly in contact with the steps while moving within the limiting track.

10. The illumination device of claim 1, wherein the light source is a light emitting diode (LED).

11. The illumination device of claim 1, wherein the illumination module further comprises:
    a switch being electrically connected to the light source, wherein when the illumination module is respectively situated in the open position and the closed position, the switch forms a close circuit and an open circuit to activate and deactivate the light source respectively.

12. The illumination device of claim 1, wherein the illumination device is suitable for using in an electronic apparatus, and the illumination device is used for illuminating the electronic apparatus while situated in the open position.

13. The illumination device of claim 12, wherein the chassis is formed integrally with the electronic apparatus.

14. An operating method of an illumination device that comprises a chassis and an illumination module, wherein the illumination module comprises a housing with a limiting track having a plurality of stair-like steps comprising:
    applying a push force to the illumination module situated in a closed position;
    providing a positioning mechanism having a positioning pin;
    moving the positioning pin within the limiting track along an irreversible single direction in a manner of having an end of the positioning in contact with the stair-like steps so as to pivotally rotate the illumination module from the closed position to an open position relative to the chassis;
    entering a light-on state of the illumination module when the illumination module is situated in the open position;
    applying another push force to the illumination module situated in the open position so that the illumination module rotates from the open position to the closed position relative to the chassis; and
    entering a light-off state of the illumination module when the illumination module is situated in the closed position.

15. The operating method of claim 14, wherein the step of pivotally rotating the illumination module from the closed position to the open position comprises:
    providing torsion to the illumination module from an elastic element to drive the pivotal rotation of the illumination module.

16. The operating method of claim 14, wherein the limiting track is generally heart-shaped and has a dented location and a vertex location, the illumination module respectively stays in the closed position and the open position when the positioning pin is positioned in the dented location and the vertex location respectively, and in the step of applying the push force to the illumination module situated in the closed position, said end of the positioning pin is moved away from the dented location along the single direction.

17. The operating method of claim 16, wherein in the step of applying another push force to the illumination module situated in the open position, said end of the positioning pin is moved away from the vertex location along the single direction.

18. The operating method of claim 14, wherein the step of entering the light-on state of the illumination module comprises:
 forming a close circuit through a switch to activate a light source of the illumination module.

19. The operating method of claim 18, wherein the step of entering the light-off state of the illumination module comprises:
 forming an open circuit through the switch to deactivate the light source.

* * * * *